(No Model.)
F. W. SCHNEIDER.
PASTE CARRYING PLATE FOR ELECTRIC ACCUMULATORS.
No. 564,652. Patented July 28, 1896.
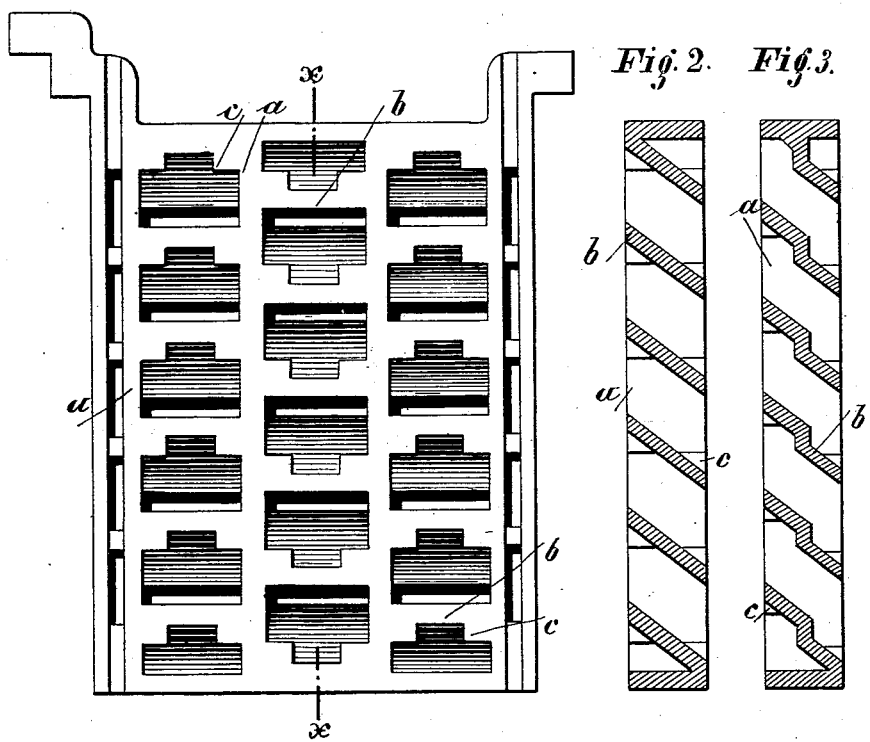
Witnesses.
Inventor:
F. W. Schneider
per R. Haddan
Attorney.

UNITED STATES PATENT OFFICE.

FRIEDRICH WILHELM SCHNEIDER, OF TRIBERG, GERMANY.

PASTE-CARRYING PLATE FOR ELECTRIC ACCUMULATORS.

SPECIFICATION forming part of Letters Patent No. 564,652, dated July 28, 1896.

Application filed May 2, 1896. Serial No. 589,982. (No model.)

*To all whom it may concern:*

Be it known that I, FRIEDRICH WILHELM SCHNEIDER, a subject of the Grand Duke of Baden, and a resident of Triberg, in the Grand Duchy of Baden, in the German Empire, have invented certain new and useful Improvements in Paste-Carrying Plates for Electric Accumulators, of which the following is a specification.

The invention relates to paste-carrying plates for electric accumulators; and it consists in an improved plate having special qualities of stiffness and stability and good conductivity.

The plates made according to this invention are therefore especially suitable for accumulator-batteries for locomotive purposes.

In the annexed drawings the electrode-plate is shown in two modifications.

Figure 1 shows a front view of the plate; Fig. 2, a section on line $x\,x$ of Fig. 1; Fig. 3, the same section, but showing a slight modification of construction.

The longitudinal bars $a$ of the plate forming essentially a grate-like structure are perpendicular to the plate-surface and are united by flat, Figs. 1 and 2, or step-like, Fig. 3, oblique cross-bridges $b$, which, being oblique to the surface and separated from one another by intervals, not only give to the plate the necessary stiffness, but also form, in connection with the longitudinal bars $a$, hollow spaces serving to receive the filling-paste. The parts $c$, provided on the bridges $b$ and standing out vertically from the plate-surface, hinder the falling out of the filling, but allow of the free extension of the same. The oblique cross-bridges $b$, between the longitudinal bars $a$, are arranged conveniently in rows alternately higher and lower across the plate, as shown in Fig. 1.

I claim as my invention—

A paste-holding plate for electric accumulators consisting of parallel bars $a$ the sides of which are perpendicular to the faces of the plate, and are connected each to the next by bridges $b$ oblique to the surfaces of the plate, said bridges having respectively on their upper and lower faces parts $c$ perpendicular to the face of the plate and placed at the corners where the bridges connect with the bars $a$ substantially as described and illustrated.

In testimony whereof I have signed this specification in the presence of two subscribing witnesses.

FRIEDRICH WILHELM SCHNEIDER.

Witnesses:
 KARL MÜLLER,
 H. C. MORANO.